(12) United States Patent
Marx

(10) Patent No.: US 12,729,731 B2
(45) Date of Patent: Sep. 8, 2026

(54) BRAKE ACTUATOR ASSEMBLY, AND METHOD FOR PRODUCING A BRAKE ACTUATOR ASSEMBLY

(71) Applicant: ZF Active Safety GmbH, Koblenz (DE)

(72) Inventor: Andreas Marx, Hartenfels (DE)

(73) Assignee: ZF Active Safety GmbH, Koblenz (DE)

( * ) Notice: Subject to any disclaimer, the term of this patent is extended or adjusted under 35 U.S.C. 154(b) by 408 days.

(21) Appl. No.: 18/462,814

(22) Filed: Sep. 7, 2023

(65) Prior Publication Data

US 2024/0084866 A1 Mar. 14, 2024

(30) Foreign Application Priority Data

Sep. 12, 2022 (DE) ........................ 102022123155.0

(51) Int. Cl.
*F16D 65/18* (2006.01)
*F16D 121/24* (2012.01)
*F16D 125/40* (2012.01)

(52) U.S. Cl.
CPC .......... *F16D 65/18* (2013.01); *F16D 2121/24* (2013.01); *F16D 2125/40* (2013.01)

(58) Field of Classification Search
CPC ...... F16D 65/18; F16D 65/14; F16D 2121/24; F16D 55/226; F16D 65/183; F16D 2066/005; F16D 2121/04; F16D 2125/40
See application file for complete search history.

(56) References Cited

U.S. PATENT DOCUMENTS

2012/0103733 A1* 5/2012 Sekiguchi ............... F16D 65/18 188/72.1

FOREIGN PATENT DOCUMENTS

| | | | |
|---|---|---|---|
| DE | 10014993 | A1 | 9/2001 |
| DE | 102011002565 | A1 | 8/2011 |
| DE | 112013005570 | T5 | 8/2015 |
| DE | 112019005355 | T5 | 7/2021 |

OTHER PUBLICATIONS

WO document No. 03020563 to Beurle et al published on Mar. 13, 2003.*
Translation of German Patent No. DE 10014993 to Hilzinger et al obtained from U.S. PTO database on Nov. 24, 2025.*

(Continued)

*Primary Examiner* — Pamela Rodriguez
(74) *Attorney, Agent, or Firm* — Kristin L. Murphy

(57) ABSTRACT

A brake actuator assembly for a vehicle brake, in particular an electromechanical vehicle brake, is provided, having a brake piston for a brake pad, which brake piston is movable between a retracted position and an extended position, a brake calliper, in which a space for a brake rotor is formed and in which the brake piston is movable, and a spindle drive coupled with the brake piston for moving the brake piston. A rotatably mounted spindle of the spindle drive bears axially against a support plate which is fixed in the axial direction, such that the support plate is subjected to a bending moment when the brake piston is extended, wherein at least one stress sensor for measuring the bending moment is arranged on the support plate. A method for producing a brake actuator assembly is further provided.

18 Claims, 1 Drawing Sheet

(56) References Cited

OTHER PUBLICATIONS

Translation of German Patent No. DE 102011002565 to Bachon obtained from U.S. PTO database on Nov. 24, 2025.*
Translation of German Patent No. DE 112013005570 to Yasui et al obtained from U.S. PTO database on Nov. 24, 2025.*
Translation of German Patent No. DE 102019005355 to Kinoshita et al obtained from U.S. PTO database on Nov. 24, 2025.*

* cited by examiner

BRAKE ACTUATOR ASSEMBLY, AND METHOD FOR PRODUCING A BRAKE ACTUATOR ASSEMBLY

CROSS-REFERENCE TO RELATED APPLICATION

This application claims priority to German Priority Application No. 102022123155.0, filed Sep. 12, 2022, the disclosure of which is incorporated herein by reference in its entirety.

TECHNICAL FIELD

The disclosure relates to a brake actuator assembly for a vehicle brake, in particular an electromechanical vehicle brake, having a brake piston for a brake pad, which brake piston is movable between a retracted position and an extended position, and to a method for producing a brake actuator assembly.

BACKGROUND

Where electromechanical vehicle brakes are used, a brake actuator assembly is associated, for example, with each brakeable wheel of a vehicle in order to brake the corresponding wheel.

In order to achieve stable and comfortable braking behaviour, a symmetrical brake force setting at opposite wheels of each vehicle axle is desirable.

It is known to estimate a brake force from the motor position and the motor current by a model for the force path. However, this method is complex.

Furthermore, it is possible to use a torque or force sensor in the power train of the brake actuator assembly in order to achieve an exact and synchronous setting of the brake force at the output of the brake actuator assemblies. Such sensors are expensive, however, and occupy a large amount of installation space. A further disadvantage of the known torque and force sensors is the combination of measuring range and resolution specified for some designs.

SUMMARY

Accordingly, a brake actuator assembly which allows a symmetrical brake force to be set in a simple manner is disclosed.

This object is achieved according to the invention by a brake actuator assembly for a vehicle brake, in particular an electromechanical vehicle brake. The brake actuator assembly comprises a brake piston for a brake pad, which brake piston is movable between a retracted position and an extended position, a brake calliper, in which a space for a brake rotor is formed and in which the brake piston is movable, and a spindle drive coupled with the brake piston for moving the brake piston. The spindle drive is in particular a ball screw. A rotatably mounted spindle of the spindle drive bears axially against a support plate fixed in the axial direction, such that the support plate is subjected to a bending moment when the brake piston is extended, wherein at least one stress sensor for measuring the bending moment is arranged on the support plate.

Because the stiffness of the support plate is known, the brake force brought about by the brake actuator assembly can be inferred with high accuracy from the measured bending moment. In this manner, a desired brake force can be set with low tolerance. In particular, a symmetrical brake force setting at opposite wheels is possible.

The stiffness of the support plate is in particular chosen such that the support plate bends when a brake force occurs. At the same time, the stiffness of the support plate is sufficiently high that reliable supporting of the spindle drive is ensured even in the case of a high brake force.

The support plate with the stress sensor can be integrated into the existing installation space in a space-saving manner.

The support plate is to be a part that is separate from the casing, in order that it can easily be adjusted and designed.

Because the support plate is stationary, simple contacting of the stress sensor is possible.

The spindle of the spindle drive has a step, for example, and lies with the step against the support plate, that is to say the support plate is arranged between the ends of the spindle. Mounting is thus particularly simple. In particular, the spindle automatically comes into contact with the support plate on assembly of the brake actuator assembly.

The at least one stress sensor can be arranged on the side of the support plate opposite the side against which the spindle bears. It is thus avoided that the rotating spindle rubs against the stress sensor and possibly damages it.

The at least one stress sensor can be a strain gauge. Strain gauges are particularly inexpensive and additionally have a small installation space requirement.

According to an exemplary arrangement, the brake actuator assembly comprises an electric motor which is coupled in terms of drive with the brake piston by way of a transmission unit and the spindle drive in order to move the brake piston between the retracted position and the extended position. Via the electric motor, a brake force can be set precisely, in particular on the basis of the bending moment detected by the voltage sensor.

The transmission unit can be accommodated in a transmission casing which lies against the brake calliper. This contributes towards a compact construction of the brake actuator assembly.

Electric cables for contacting the at least one stress sensor run, for example, out of the transmission casing into the brake calliper to the stress sensor. Specifically, the electric cables run to the stress sensor starting from a circuit board accommodated in the transmission casing. Contacting of the stress sensor is thus particularly simple. In particular, the distance from the circuit board accommodated in the transmission casing to the stress sensor is very short.

According to an exemplary arrangement, the support plate is held, in particular clamped, between the transmission casing and the brake calliper. In this manner, the support plate is axially fixed. Separate fastening devices for axially fixing the support plate are therefore not necessary.

In another exemplary arrangement, there can be a step in the brake calliper against which the support plate lies axially, wherein the support plate is held against the step by a securing ring. Flexible positioning of the support plate is thus possible.

The spindle of the spindle drive can be rotatably mounted and axially fixed by an axial bearing, wherein the axial bearing lies against the support plate. By using an axial bearing, the spindle is prevented from rubbing against the support plate, so that wear of the support plate is prevented and the stiffness of the support plate remains unchanged over a long period of time.

A method for producing a brake actuator assembly is disclosed, wherein a support plate having a defined stiffness is selected in accordance with a required force measuring range from a plurality of support plates having different stiffnesses and is used in the brake actuator assembly. In this manner, the force measuring range can be adapted to a particular actuator power while the stress sensor remains the same. Specifically, the optimal measuring range and thus also optimal resolution can be established for all power classes of actuators in a particularly simple manner and without additional costs due to the choice of support plate. The sensor elements, the evaluation electronics and the evaluation software can be kept identical or largely identical.

The support plates of different stiffnesses can differ in terms of material and/or thickness and/or geometry (e.g. with or without ribs).

The support plates having different stiffnesses can have an identical thickness at least in a region in which the support plate is held axially in the brake actuator assembly. It is thus not necessary to adapt the axial fixing of the support plate in the brake actuator assembly for different support plates.

BRIEF DESCRIPTION OF DRAWINGS

Further advantages and features of the disclosure will become apparent from the following description and from the accompanying drawings, to which reference will be made. In the drawings.

DETAILED DESCRIPTION

Figure 1:
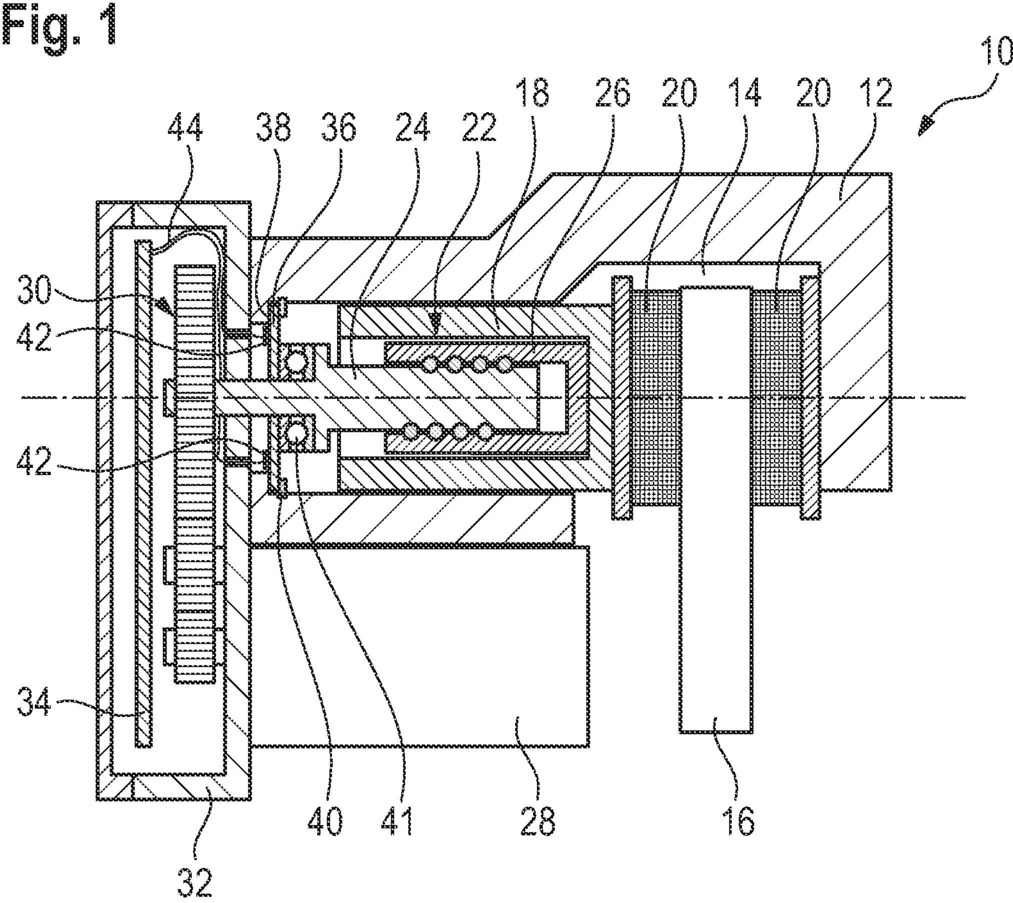
FIG. 1 shows, schematically, a brake actuator assembly according to the disclosure.

FIG. 1 shows a brake actuator assembly 10 for an electromechanical vehicle brake.

The brake actuator assembly 10 comprises a brake calliper 12 in which a space 14 for a brake rotor 16 is formed.

The brake actuator assembly 10 further has a brake piston 18 for a brake pad 20.

The brake piston 18 is movable between a retracted position and an extended position. More specifically, the brake piston 18 is movable into the space 14 for the brake rotor 16.

A spindle drive 22 is coupled with the brake piston 18, in particular coupled in the axial direction, for moving the brake piston 18.

The spindle drive 22 has a rotatably mounted spindle 24 and an axially displaceable spindle nut 26 mounted in a rotationally fixed manner in the brake calliper.

The spindle 24 is positioned in an axially fixed manner.

In an exemplary arrangement, the spindle drive 22 is a ball screw.

For driving the spindle drive 22 there is an electric motor 28 which is coupled by way of a transmission unit 30 to the spindle 24 of the spindle drive 22 in order to rotate the spindle.

That is to say, the electric motor 28 is coupled in terms of drive with the brake piston 18 by way of the transmission unit 30 and the spindle drive 22 in order to move the brake piston between the retracted position and the extended position.

The transmission unit 30 is accommodated in a transmission casing 32 which lies against the brake calliper 12. In addition to the gearwheels of the transmission unit 30, a circuit board 34 is also accommodated in the transmission casing 32.

The spindle 24 of the spindle drive 22 is coupled with the transmission unit 32 and extends from the transmission casing 32 into the brake calliper 12.

There is arranged in the brake calliper a support plate 36 which is fixed in the axial direction.

The rotatably mounted spindle 24 of the spindle drive 22 bears axially against the support plate 36, such that the support plate 36 is subjected to a bending moment when the brake piston 18 is extended.

In particular, the forces that are brought about by the brake piston 18 on the brake pad 20, or the brake rotor 16, occur at least for the most part as a counter-force on the support plate 36.

For axially fixing the support plate 36 there is a step 38 in the brake calliper 12, against which the support plate 36 lies.

In addition, the support plate 36 is held against the step 38 by a securing ring 40.

In another exemplary arrangement, the support plate 36 is held, in particular clamped, between the transmission casing 32 and the brake calliper 12. A corresponding position of the support plate 36 is depicted by a broken line in FIG. 1. In this case, the transmission casing 32 and/or the brake calliper 12 have a corresponding opening.

The spindle 24 bears against the support plate 36 by an axial bearing 41, which in an exemplary arrangement is a roller bearing.

The support plate 36 can be manufactured from plastics material or from metal.

At least one stress sensor 42 for measuring the bending moment that occurs during a braking operation is arranged on the support plate 36.

In an exemplary arrangement, the stress sensor 42 is a strain gauge, but other sensors are also conceivable.

Electric cables 44 for contacting the at least one stress sensor 42 run out of the transmission housing 32 into the brake calliper 12 to the stress sensor 42.

The brake actuator assembly 10 can be standardizable. For this purpose, during production of the brake actuator assembly 10, a support plate 36 having a defined stiffness can be selected in accordance with a required force measuring range from a plurality of support plates 36 having different stiffnesses and can be used in the brake actuator assembly 10.

Figure 2:
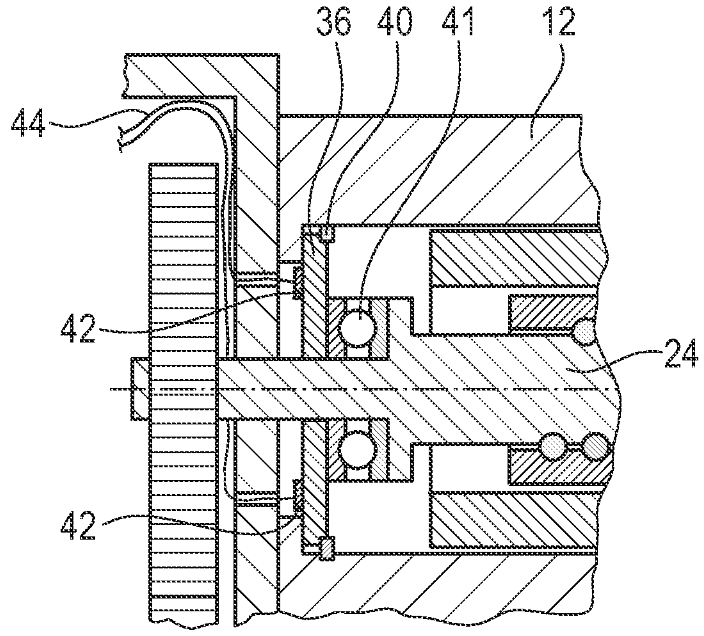
FIG. 2 shows, schematically, a detail view of a further brake actuator assembly according to the disclosure.

This becomes clear in particular when comparing FIG. 1 and FIG. 2.

FIG. 2 shows a detail view of a further brake actuator assembly 10, wherein different support plates 36 are used in the brake actuator assemblies 10 shown in FIGS. 1 and 2.

The support plate 36 illustrated in FIG. 2 is in particular thicker and thus, at least when the same material is used, stiffer than the support plate 36 illustrated in FIG. 1.

The support plates 36 having different stiffnesses here have an identical thickness in a region in which the support plate 36 is held axially in the brake actuator assembly 10, specifically in the radial region in which the support plate 36 is held between the brake calliper 12 and the securing ring 40.

The sensor elements 42 applied to the different support plates can be identical.

It is, however, also conceivable to select from different support plates having different sensor elements.

The invention claimed is:

1. A brake actuator assembly, comprising:

a brake piston for a brake pad, which brake piston is movable between a retracted position and an extended position, a brake calliper in which a space for a brake rotor is formed and in which the brake piston is movable, a spindle drive coupled with the brake piston for moving the brake piston, wherein a rotatably mounted spindle of the spindle drive bears axially against a support plate fixed in the axial direction, such that the support plate is subjected to a bending moment when the brake piston is extended, and wherein at least one stress sensor is arranged on the support plate, the at least one stress sensor configured for measuring the bending moment of the support plate caused by the axial bearing force of the spindle, wherein the support plate is a planar plate element distinct from a spherical bearing element and configured to elastically bend under braking load.

2. The brake actuator assembly according to claim 1, wherein the at least one stress sensor is a strain gauge.

3. The brake actuator assembly according to claim 1, wherein the brake actuator assembly comprises an electric motor which is coupled in terms of drive with the brake piston by way of a transmission unit and the spindle drive in order to move the brake piston between the retracted position and the extended position.

4. The brake actuator assembly according to claim 3, wherein the transmission unit is accommodated in a transmission casing which lies against the brake calliper.

5. The brake actuator assembly according to claim 4, wherein electric cables for contacting the at least one stress sensor run out of the transmission casing into the brake calliper to the stress sensor.

6. The brake actuator assembly according to claim 4, wherein the support plate is held between the transmission casing and the brake calliper.

7. The brake actuator assembly according to claim 1, wherein there is a step in the brake calliper against which the support plate lies axially, wherein the support plate is held against the step by a securing ring.

8. The brake actuator assembly according to claim 1, wherein the spindle of the spindle drive is rotatably mounted and axially fixed by an axial bearing, wherein the axial bearing lies against the support plate.

9. A method for producing a brake actuator assembly according to claim 1, wherein the support plate has a defined stiffness is selected in accordance with a required force measuring range from a plurality of support plates having different stiffnesses and is used in the brake actuator assembly.

10. The method according to claim 9, wherein each of the support plates having different stiffnesses have an identical thickness at least in a region in which each of the support plates is held axially in the brake actuator assembly.

11. A brake actuator assembly, comprising:

a brake piston for a brake pad, wherein the brake piston is movable between a retracted position and an extended position, a brake calliper defining a space for a brake rotor and in which the brake piston movable, a spindle drive coupled with the brake piston and configured to move the brake piston, wherein a rotatably mounted spindle of the spindle drive bears axially against a planar support plate fixed in the axial direction such that the support plate is subjected to a bending moment when the brake piston is extended, and wherein at least one stress sensor is positioned on the support plate to measure elastic bending of the support plate caused by axial load from the spindle, wherein the support plate is free of spherical bearing surfaces so as to prevent angular articulation of the spindle relative to the brake caliper.

12. The brake actuator assembly according to claim 11, wherein the at least one stress sensor is a strain gauge.

13. The brake actuator assembly according to claim 11, wherein the brake actuator assembly comprises an electric motor that is coupled to the brake piston by way of a transmission unit and the spindle drive in order to move the brake piston between the retracted position and the extended position.

14. The brake actuator assembly according to claim 13, wherein the transmission unit includes a transmission casing that is disposed against the brake calliper.

15. The brake actuator assembly according to claim 14, further comprising electric cables for contacting the at least one stress sensor run out of the transmission casing into the brake calliper to the stress sensor.

16. The brake actuator assembly according to claim 14, wherein the support plate is biased between the transmission casing and the brake calliper.

17. The brake actuator assembly according to claim 11, wherein there is a step in the brake calliper against which the support plate lies axially, wherein the support plate is held against the step by a securing ring.

18. The brake actuator assembly according to claim 11, wherein the spindle of the spindle drive is rotatably mounted and axially fixed by an axial bearing, wherein the axial bearing is disposed against the support plate.

* * * * *